US006306938B1

(12) United States Patent
Mathers et al.

(10) Patent No.: US 6,306,938 B1
(45) Date of Patent: *Oct. 23, 2001

(54) PRODUCTION PROCESS

(75) Inventors: Richard Ernest Mathers, Houston; David Keirs, Paisley; Kenneth Grant Dykes, Glasgow; Thomas Healy, Paisley, all of (GB)

(73) Assignee: Ciba Specialty Chemicals Corp., Tarrytown, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/294,042

(22) Filed: Apr. 19, 1999

(30) Foreign Application Priority Data

Apr. 20, 1998 (GB) .................................................. 9808169

(51) Int. Cl.⁷ ............................ C08L 93/04; C08L 11/08; C08K 5/34; C09B 67/50; C09B 67/04
(52) U.S. Cl. ............................ 524/88; 523/160; 106/410; 106/411; 106/412; 106/413; 540/141
(58) Field of Search ..................................... 523/160, 161; 106/410, 411, 412, 413; 524/88; 540/141, 142

(56) References Cited

U.S. PATENT DOCUMENTS

| 2,755,195 | * | 7/1956 | Grubenmann | 106/400 |
|---|---|---|---|---|
| 3,437,503 | | 4/1969 | Massam et al. | 106/109 |
| 3,523,030 | | 8/1970 | Malin et al. | 106/288 |
| 3,748,164 | * | 7/1973 | Akamatsu et al. | 524/88 |
| 4,104,277 | * | 8/1978 | Langley | 540/141 |
| 4,155,773 | * | 5/1979 | Ferrill, Jr. | 106/413 |
| 4,257,951 | | 3/1981 | Matrick | 260/314.5 |
| 4,260,424 | * | 4/1981 | Mizoguchi et al. | 106/500 |
| 4,404,036 | * | 9/1983 | Donegan | 106/412 |
| 4,448,607 | * | 5/1984 | Johnson et al. | 106/411 |
| 4,981,888 | * | 1/1991 | Langley et al. | 524/88 |
| 5,284,511 | * | 2/1994 | Rolf et al. | 106/410 |
| 5,393,339 | * | 2/1995 | Gerson et al. | 106/410 |
| 5,444,163 | * | 8/1995 | Dornhagen et al. | 540/133 |
| 5,449,774 | | 9/1995 | Lambie et al. | 540/141 |
| 5,492,563 | * | 2/1996 | Urban | 106/412 |
| 5,648,408 | * | 7/1997 | Babler | 523/333 |
| 5,772,750 | | 6/1998 | Tomiya et al. | 106/413 |
| 5,776,237 | | 7/1998 | Tomiya et al. | 106/412 |
| 5,776,238 | | 7/1998 | Kerwin et al. | 16/412 |

FOREIGN PATENT DOCUMENTS

| 695548 | * | 10/1964 | (CA) . |
|---|---|---|---|
| 0317876 | | 5/1989 | (EP) . |
| 0392334 | | 10/1990 | (EP) . |
| 0 774494 | | 11/1996 | (EP) . |
| 1140836 | | 1/1969 | (GB) . |
| 1541699 | | 3/1979 | (GB) . |
| 63081168 | * | 4/1988 | (JP) . |

OTHER PUBLICATIONS

Weast, Robert C.; CRC Handbook, The Chemical Rubber Co., Cleveland (p. D–28), 1969.*
Derwent Abstr. 1990–321333 for EP 392334.
Abstract sheet for EP 0 819,740 (1998).

* cited by examiner

Primary Examiner—Vasu Jagannathan
Assistant Examiner—Callie E. Shosho
(74) Attorney, Agent, or Firm—David R. Crichton

(57) ABSTRACT

The present invention provides a process for the production of pigmentary copper phthalocyanine in the beta crystalline phase comprising:

a) dry or aqueous milling of crude copper phthalocyanine in combination with a natural or chemically modified resin and, optionally, a grinding auxiliary followed by;
b) isolation of the milled mass followed by;
c) conditioning treatment of the milled mass.

35 Claims, No Drawings

PRODUCTION PROCESS

TECHNICAL FIELD

The present invention relates to a process for the production of copper phthalocyanine pigment compositions which are useful in the coloration of surface coatings, especially oil ink formulations used in printing.

The production of copper phthalocyanine pigments via milling of crude copper phthalocyanine in the presence of grinding auxiliaries such as organic/inorganic salts followed by either a separate solvent treatment with partially water miscible solvents, as detailed in British Patent number GB 140836, or, a separate aqueous emulsion treatment of the milled mass with liquid amines in the presence of surfactants such as an alkali metal salt of wood rosin, as detailed in U.S. Pat. No. U.S. Pat. No. 5,449,774, are known. Where the solvent treatment step involves the use of polar aliphatic solvents, as disclosed in GB 1140836, the initial dry (substantially liquid free) milling step requires a high proportion of the grinding auxiliary such as organic/inorganic salts, typically 2 parts grinding auxiliary to 1 part of crude copper phthalocyanine.

Surprisingly we have now found that the milling of crude copper phthalocyanine in combination with natural or chemically-modified resins followed by a separate solvent conditioning or aqueous emulsion conditioning treatment leads to copper phthalocyanine compositions which exhibit superior pigmentary properties versus pigment compositions produced according to the method of GB1140836 or U.S. Pat. No. 5,449,774. In particular, the copper phthalocyanine compositions of the present invention demonstrate improved colour strength; gloss; and dispersion properties, especially when formulated into oil ink formulations. Furthermore, the process according to the present invention allows for a significant reduction, versus the process of GB1140836, in the amount of traditional grinding auxiliary material, such as organic/inorganic salts, when the subsequent conditioning step involves solvent. The use of the process of the present invention provides a more efficient and effective throughput of pigmentary material versus the process disclosed in GB 1140836.

SUMMARY OF THE INVENTION

Accordingly, the present invention provides a process for the production of pigmentary copper phthalocyanine in the beta crystalline phase comprising:

a) dry or aqueous milling of crude copper phthalocyanine in combination with a natural or chemically modified resin and, optionally, a grinding auxiliary followed by;

b) isolation of the milled mass followed by;

c) conditioning treatment of the milled mass.

DESCRIPTION

As an essential step in the process according to the present invention the crude copper phthalocyanine is co-milled with a natural or chemically modified resin and optionally a grinding auxiliary. Crude in respect of copper phthalocyanine, as defined herein, means of non-pigmentary size, typically more than about 10 microns.

The crude copper phthalocyanine is prepared by any of the well established processes such as reaction at elevated temperature of phthalic anhydride with urea and a copper salt in the presence of a catalytic amount of a transition metal compound such as ammonium molybdate, the reaction being carried out in a high boiling aromatic solvent such as nitrobenzene or in the absence of solvent in a "dry-bake" process. Standard processes for the production of crude copper phthalocyanine are detailed in "Phthalocyanine Compounds" by Moser and Thomas, Reinhold Publishing Corporation 1963 the disclosures of which are incorporated herein by reference.

Resins suitable for use in the process of the present invention include rosin, the principal component of which is abietic acid; chemically modified rosins such as hydrogenated, dehydrogenated or disproportionated rosin; dimerised or polymerised rosin; partially esterified rosin; non-esterified or partially esterified maleic- or phenolic-modified rosin and rosin or rosin derivatives polymerised with substances like formaldehyde and mixtures thereof. Preferred resins for use herein include such commercially available materials as Staybelite® resin (hydrogenated rosin) available from Hercules (United States), Recoldis A resin® (disproportionated rosin) as distributed in Britain by Langley Smith (Britain), and Dymerex® resin (dimerised rosin) available from Hercules (United States). In the milling stage, the natural or chemically-modified resin is generally present in an amount of from about 1% to about 15%, preferably from about 2% to about 5% by weight, based on the weight of crude copper phthalocyanine charged to the milling apparatus. The preferred resins in the present invention are hydrogenated rosin and disproportionated rosin.

A grinding auxiliary, as defined herein, means any material used to aid the reduction in size of copper phthalocyanine from crude to pigmentary using attrition/grinding technology. Grinding auxiliary materials suitable for use in the process of the present invention include, calcium chloride, sodium chloride, sodium sulphate, sodium formate, sodium acetate or other organic or inorganic salt, phthalimide or phthalic anhydride and mixtures thereof The preferred grinding auxiliaries in the present invention are sodium formate, sodium chloride and sodium acetate. Where the milling is effected by a dry milling technique, the grinding auxiliary is present in an amount of from about 2% to about 15 %, preferably from about 6% to about 8 % by weight, based on the weight of crude copper phthalocyanine charged to the milling apparatus.

Milling, as defined herein, means a process by which the solids are subjected to attrition, grinding etc. to achieve particle size reduction. Dry milling, as defined herein, means a process by which the solids are subjected to attrition, grinding etc. to achieve particle size reduction while substantially free of liquid. However as detailed later herein, a low level of solvent (or amine) may be added during the milling stage. Milling of the crude copper phthalocyanine and resin mixture of the present invention may be effected by either a dry or aqueous technique. If the milling is effected by a dry technique, suitable apparatus may be a ball mill or a vibration mill. If the milling is performed in an aqueous medium, the apparatus used is conveniently a bead mill. Where the milling is effected in an aqueous medium, there is no requirement for a grinding auxiliary.

As a second essential step in the process according to the present invention the milled mixture (of crude copper phthalocyanine, resin and optionally grinding auxiliary) is isolated. Where the milling step was essentially a dry process the milled mass may be isolated by direct discharge from the milling apparatus. Where milling was effected by an aqueous milling technique, the milled mass is isolated in powder form. However, if the conditioning of the milled mass is to be effected by emulsion treatment, then the milled mass which has been generated by an aqueous milling technique may optionally be isolated and used in the subsequent emulsion conditioning step in the form of a "filter cake".

As a further essential step in the process of the present invention the isolated milled mixture of crude copper phthalocyanine, resin, and optionally, grinding auxiliary is conditioned either by treatment with a solvent, an emulsion or with a carboxylic acid.

Where conditioning is effected via treatment with a solvent the milled mass is dispersed into the solvent by addition, either portion-wise or a single addition, and agitation until fully "wetted out" so that all the dry mass is in contact with solvent. An aqueous solution of the resin may be added at this stage at a level of from 0 to about 10%, preferably from about 1% to about 5% by weight of the crude copper phthalocyanine. The resultant slurry is then heated to temperatures ranging from about 50° C. to the boiling point of the solvent. The solvent treatment is performed for sufficient time to allow conversion of the pigmentary copper phthalocyanine to substantially the beta crystalline modification. Such phase change can be routinely monitored using standard analytical techniques such as Infra Red Adsorption Spectroscopy. Determination of the necessary settings to determine the charateristic peaks for the α and β forms is a matter of routine experimentation. The temperature and time required to effect this change, from α to β, is dependent on the crystallising effect of the solvent e.g. some solvents, such as chloroform, are able to cause phase change at room temperature in short periods of time. After such solvent conditioning, the pigmentary form of beta copper phthalocyanine is separated from the mass by typically firstly contacting with dilute mineral acid such as hydrochloric acid or dilute base such as potassium hydroxide to aid removal of the solvent, followed by removal of solvent for instance by filtration or centrifugation. If the solvent is water miscible, water may be added at the end of the solvent conditioning step and the solvent removed by azeotropic distillation. The product may then be isolated by conventional filtration and drying technologies.

Preferred solvents for use herein are polar aliphatic solvents. Suitable solvents for use in the present process can be selected from a wide variety of chemical types and include for example, methanol, ethanol, n-propanol, isopropanol, n-butanol, iso-butanol, pentanol, or other lower alcohol; ethyl acetate or other lower alkyl monocarboxylate; acetone, methyl ethyl ketone, methyl isobutyl ketone or other dialkyl ketone; 2-methoxy ethanol, 2-ethoxy ethanol or other lower alkoxy alkanol ; ethylene glycol, diethylene glycol or other alkylene glycol and mixtures thereof.

Preferred are also mixtures of water with lower alcohols, like methanol, ethanol, n-propanol, isopropanol, n-butanol, iso-butanol, pentanol or other lower alcohols. Preferred lower alcohols for such mixtures are n-propanol, isopropanol, n-butanol or iso-butanol, especially n-butanol or iso-butanol. Highly preferred as a lower alcohol is n-butanol. These mixtures contain preferably more than 50% by weight, especially more than 75% by weight, of water. Important mixtures are those which contain 80% to 98% by weight of water and 2% to 20% by weight of lower alcohols; especially 90 to 95% by weight of water and 5% to 10% by weight of lower alcohols.

Further preferred solvents in the present invention are those which are at least partially water miscible and capable of forming an azeotropic mixture with water. In such cases the polar aliphatic solvent may contain dissolved water in a proportion which is insufficient to cause separation into two phases. The solvent may be generally used in an amount which is 200% to 1000%, preferably 400% to 800% relative to the weight of the starting mass to be milled (crude copper phthalocyanine, resin and optional grinding auxiliary).

Furthermore, a proportion of the solvent (typically 1–5%) which is used for the solvent treatment may optionally be incorporated at the milling stage described above Preferred carboxylic acids for use herein include: 2-ethyl hexanoic acid, oleic acid, caproic acid, valeric acid or other $C_4$–$C_{20}$ linear or branched aliphatic carboxvlic acids and mixtures thereof. The carboxylic acid may be generally used in an amount which is 200% to 1000%, preferably 400% to 800% relative to the weight of the starting mass to be milled (crude copper phthalocyanine, resin and optional grinding auxiliary). Furthermore, a proportion of the carboxylic acid (typically 1–5%) which is used for the conditioning treatment may optionally be incorporated at the milling stage described above Emulsion conditioning treatment of the milled mass (either as dry powder or aqueous milled dispersion or "filter-cake") is effected by mixing with an emulsion containing liquid $C_6$–$C_{20}$ amine in water as well as an additional amount of resin salt. Typically, the resin salt is present at an amount of from 0 to 10%, preferably from about 1% to about 5% by weight of the crude copper phthalocyanine. The liquid amine may be mono-, di-, or tri-amine and may be aliphatic or aromatic in nature. Examples of suitable amines are $C_7$–$C_{16}$ alkyl mono amines and aliphatic diamines having the formula $RNH.CHCH_2CH_2CH_2NH_2$ in which R is a $C_{12}$–$C_{16}$ aliphatic radical such as the tallow or coco (lauryl) radical. Aryl amines include aniline and $C_1$–$C_4$ alkyl-substituted anilines such as o-toluidine, N,N-diethylaniline and N,N-dimethylaniline. The amount of amine used may generally be from about 2% to about 50%, preferably from about 5% to about 30% by weight, based on the weight of copper phthalocyanine contained in the milled mass. Furthermore, a proportion of the amine (typically from about 1% to about 20%) which is used in the emulsion treatment step may optionally be incorporated at the milling stage as described above. The emulsification step is aided by the generation of an alkali metal salt of the natural or chemically-modified resin by addition of sodium or potassium hydroxide. The mixing of the milled mass in the emulsion treatment is generally effected at an elevated temperature, e.g. at a temperature within the range of from 20° C. to 100° C. and preferably from 40° C. to 70° C. and is performed for sufficient time that the pigmentary copper phthalocyanine is substantially in the beta crystalline modification.

After the emulsion treatment is complete, as assessed by the conversion from the α to β crystal form of the copper phthalocyanine, the mixture is rendered acidic preferably by lowering the pH of the mixture to below 1.5 by adding ineral acid. The effect of acidifying the mixture is twofold. Firstly, the amine used in the emulsion treatment is transformed into an amine salt which is soluble in the aqueous phase and hence capable of being removed from the final pigment by filtration/washing. Secondly, the natural or chemically-modified resin is regenerated in its free acid form. Additional standard analytical techniques such as electron microscopy may be employed to measure the particle size and assess the crystal shape at this stage. After acidification, the pigment slurry may be filtered, washed with water and dried. The copper phthalocyanine pigment obtained in the beta crystalline modification according to the present invention exhibits excellent colour strength, gloss, and dispersion level relative to analogous products whereby the incorporation of natural or chemically-modified resins takes place after the milling step. Furthermore the copper phthalocyanine pigments obtained by the "dry milling/solvent treatment" component of the present invention exhibit significantly enhanced process throughput rates due to the significant reduction in the amount of grinding auxiliary required at the dry milling stage.

The copper phthalocyanine pigment produced by the present invention is particularly suited to oil ink applications. The pigment product is also useful as a colourant in publication gravure inks, in paints and in plastics. To enhance performance in publication gravure ink, paint or plastic systems, up to about 20%, preferably up to about 10%, more prefereably from about 1% to about 5% by weight, of an additive which may be a derivative of copper phthalocyanine may be added at any stage to the pigment product obtained according to the process of present invention. Examples of such additives include dimethylaminomethyl copper phthalocyanine or phthalimidomethyl copper phthalocyanine in which the number of substituent groups on the copper phthalocyanine molecule ranges from 1 to 4, preferably from 2 to 3; sulphonated copper phthalocyanine; or amine salt of sulphonated copper phthalocyanine and mixtures thereof.

The following non-limiting Examples further illustrate the present invention.

EXAMPLE 1
Preparation of a Heatset Oil Ink from Copper Phthalocyanine Including Hydrogenated Rosin Added at the Conditioning Treatment Stage.

A mixture of 93.2 g crude Copper Phthalocyanine and 6.8 g sodium formate are ground in a 0.6 liter vibratom ballmill until the phase change gives an α content of between about 50% and about 75%. The α content is monitored by infra red absorption spectroscopy as detailed earlier herein. 250 g of water, 15.3 g of 50% potassium hydroxide solution and 40 g of hydrogenated wood rosin are stirred until a solution is formed. Water is then added until the solution has a volume of 267 mls. 70 g of the ground Copper Phthalocyanine mixture described above is added to 200 mls IPS2 (83% isopropyl alcohol and 17% water) as supplied by Charles Tennant in the UK, and 10.5 g of the above mentioned hydrogenated wood rosin solution. The pigmented slurry is then stirred for about 4 hours at the reflux temperature of the solvent before the addition of 200 mls water. The solvent fraction of the slurry is then removed by distillation. Following distillation, 30 mls of 36% hydrochloric acid is added to the slurry. The acidified slurry is then filtered using Buchner apparatus, washed with water until the pigment is essentially free of acid and formate ions (less than about 1000 micro siemens) and the resulting β form of the pigment is then dried at about 75° C. until substantially free of moisture (less than about 1% moisture). 20 g of the β form of the pigment so obtained is premixed with 80 g of a typical heatset oil ink varnish. 100 g of the premix are three roll milled on a Buler SDY-200 3 roll mill at 23° C. for about 5 minutes.

1st dispersion pass at 10 Bar (1000K Pa)
2nd dispersion pass at 25 Bar (2500K Pa)
3rd dispersion pass at 25 Bar (2500K Pa)

Assessment of the properties of the heatset oil ink obtained is made by reducing the third pass ink (20% pigmentation) to 14% pigment with the above varnish and printing using a Prufbau® printing machine to give prints with differing film weights. A typical heatset oil ink, as defined herein, contains a blend of modified phenolic resin, alkyd resin, petroleum distillate and from 0 to 5% of auxiliaries. The print density for each print (at different film weight) is measured using a densitometer (such as the Gretag D19C). The gloss is measured at equal film weight using an Erichsen Mini glossmaster® at 60°.

EXAMPLE 2
Preparation of a Heatset Oil Ink from Copper Phthalocyanine Including Hydrogenated Rosin Added at the Conditioning Treatment Stage.

The process of Example 1 was repeated with the exception that 21.0 g of the hydrogenated wood rosin solution was added instead of 10.5 g.

The heatset oil ink of Example 2 was assessed as detailed for Example 1.

EXAMPLE 3
Preparation of a Heatset Oil Ink from Copper Phthalocyanine Including Hydrogenated Rosin Added at the Grinding Stage.

A mixture of 91.0 g crude Copper Phthalocyanine, 2.3 g hydrogenated wood rosin and 6.7 g sodium formate are ground in a ballmill until the phase change gives an α content of between about 50% and about 75%. 70 g of the ground Copper Phthalocyanine mixture described above is added to 200 mls IPS2 (83% isopropyl alcohol and 17% water) with 10 mls of 50% potassium hydroxide solution. The pigmented slurry is then stirred for about 4 hours at reflux before the addition of 200 mls water. The IPS2 fraction of the slurry is then removed by distillation. Finally 25 mls of 36% hydrochloric acid is added. The acidified slurry is filtered, washed with water until the pigment is free of acid and formate ions and the beta pigment dried at 75° C.

The heatset oil ink of Example 3 was assessed as previously detailed.

Example 3 is repeated, except using 200 mls of a mixture of 93% by weight of water and 7% by weight of n-butanol instead of 200 mls IPS2 (83% isopropyl alcohol and 17% water).

Example 3 is repeated, except using 200 mls of a mixture of 93% by weight of water and 7% by weight of iso-butanol instead of 200 mls IPS2 (83% isopropyl alcohol and 17% water).

EXAMPLE 4
Preparation of a Heatset Oil Ink from Copper Phthalocyanine Including Hydrogenated Rosin Added at the Conditioning Treatment Stage.

A mixture of 93.2 g crude Copper Phthalocyanine and 6.8 g sodium formate are ground in a ballmill until the phase change gives an α content between 50–75%. 111 g water at 55° C., 11.1 g 50% potassium hydroxide solution, 2.5 g hydrogenated wood rosin and 6.1 g N, N-diethylaniline are stirred on a light speed mixer until an emulsion is obtained. The presence of an emulsion is determined by visual analysis. 55 g of the ground Copper Phthalocyanine mixture described above and 150 g of water at 55° C. are than added to the emulsion. The pigmented emulsion is stirred for about 4 hours at about 55° C. A solution of 3.6 g of calcium chloride in 42 mls of water is then added, the slurry being stirred for about a further 30 minutes. Finally 30 mls of 36% hydrochloric acid is added. The acidified slurry is filtered, washed with water until the pigment is free of acid and formate ions and the β pigment dried at about 75° C.

The heatset oil ink of Example 4 was assessed as previously stated.

EXAMPLE 5
Preparation of a Heatset Oil Ink from Copper Phthalocyanine Including Hydrogenated Rosin Added at the Grinding Stage.

A mixture of 91.0 g crude Copper Phthalocyanine, 2.3 g hydrogenated wood rosin and 6.7 g sodium formate are ground in a ballmill until the phase change gives an α content of between about 50% and about 75%. 111 g water at 55° C., 11.1 g 50% potassium hydroxide solution, 1.3 g hydrogenated wood rosin and 6.1 g N, N-diethylaniline are stirred on a high speed mixer until an emulsion is obtained. 55 g of the ground Copper Phthalocyanine mixture described above and 150 g of water at 55° C. are added to the emulsion. The pigmented emulsion is stirred for about 4 hours at about 55° C. A solution of 3.6 g of calcium chloride in 42 mls of water is then added, the slurry being stirred for about a further 30 minutes. Finally 30 mls of 36% hydrochloric acid is added. The acidified slurry is filtered, washed with water until the pigment is free of acid and formate ions and the β pigment dried at 75° C.

The heatset oil ink of Example 5 was assessed as previously stated.

EXAMPLE 6
Preparation of a Heatset Oil Ink from Copper Phthalocyanine Including Hydrogenated Rosin Added at the Grinding Stage.

A mixture of 91.0 g crude Copper Phthalocyanine, 2.3 g hydrogenated wood rosin and 6.7 g sodium formate are ground in a ballmill until the phase change gives an α content of between about 50% and about 75%. 111 g water at 55° C., 11.1 g 50% potassium hydroxide solution, 3.9 g hydrogenated wood rosin and 6.1 g N, N-diethylaniline are stirred on a high speed mixer until an emulsion is obtained. 55 g of the ground Copper Phthalocyannie mixture described above and 150 g of water at 55° C. are added to the emulsion. The pigmented emulsion is stirred for about 4 hours at about 55° C. A solution of 3.6 g of calcium chloride in 42 mls of water is then added, the slurry being stirred for about a further 30 minutes. Finally 3 mls of 36% hydrochloric acid is added. The acidified slurry is filtered, washed with water until the pigment is free of acid and formate ions and the beta pigment dried at 75° C.

The heatset oil ink of Example 6 was assessed as previously stated.

EXAMPLE 7
Preparation of a Heatset Oil Ink from Copper Phthalocyanine Including Gum Rosin Added at the Conditioning Treatment Stage.

A mixture of 91.2 g crude Copper Phthalocyanine and 8.8 g calcium chloride are ground in a ballmill until the phase change gives an α content between about 50% and about 75%. 64.3 g of the ground Copper Phthalocyanine mixture described above and 5.7 g of gum rosin are added to 500mls of methyl isobutyl ketone (MIBK) with 50 mls of 50% potassium hydroxide solution. The pigmented slurry is then stirred on a high speed mixer for about 15 minutes at about 80° C. The high speed mixer was then replaced with a paddle stirrer and the pigmented slurry stirred for 2 hours at 80° C. Finally 30 mls of 36% hydrochloric acid is added. The acidified slurry is filtered, washed with acetone until the pigment is free of MIBK and the beta pigment dried at room temperature.

The heatset oil ink of Example 7 was assessed as previously stated.

EXAMPLE 8
Preparation of a Heatset Oil Ink from Copper Phthalocyanine Including Gum Rosin Added at the Grinding Stage.

A mixture of 83.8 g crude Copper Phthalocyannie, 8.1 g gum rosin and 8.1 g calcium chloride are ground in a ballmill until the phase change gives an α content of between about 50% and about 75%. 70 g of the ground Copper Phthalocyanine mixture described above is added to 500 mls of methyl isobutyl ketone (MIBK) with 50 mls of 50% potassium hydroxide solution. The pigmented slurry is then stirred on a high speed mixer for about 15 minutes at about 80° C. The high speed mixer was then replaced with a paddle stirrer and the pigmented slurry stirred for about 2 hours at about 80° C. Finally 30 mls of 36% hydrochloric acid is added. The acidified slurry is filtered, washed with acetone until the pigment is free of MIBK and the beta pigment dried at room temperature.

The heatset oil ink of Example 8 was assessed as previously stated.

EXAMPLE 9
Preparation of a Liquid Ink from Copper Phthalocyanine Including Hydrogenated Rosin Added at the Conditioning Treatment Stage.

The pigment was prepared as per Example 1 with the incorporation of 3% w/w on copper phthalocyanine of dimethylaminomethyl copper phthalocyanine during the final processing stage.

15 g of the dried product are mixed with 80 g of phenolic varnish and 5 g of toluene for about 15 minutes at about 60° C. and 4000 rpm using a high speed mixer such as the Dispermat FTS. 320 g of 2 mm glass beads are added and the mixture dispersed at 2000 rpm for 30 minutes. The millbase was then reduced to 8.45% using toluene and the liquid ink of Example 9 was assessed as previously described.

EXAMPLE 10
Preparation of a Liquid Ink from Copper Phthalocyanine Including Hydrogenated Rosin Added at the Grinding Stage.

The pigment was prepared as per Example 3 with the incorporation of 3% w/w on copper phthalocyanine of dimethylaminomethyl copper phthalocyanine during the final processing stage. 15 g of the dried product are mixed with 80 g of phenolic varnish and 5 g of toluene for about 15 minutes at about 60° C. and 4000 rpm using a Dispermat FTS high speed stirrer. 320 g of 2 mm glass beads are added and the mixture dispersed at 2000 rpm for 30 minutes. The millbase was then reduced to 8.45% using toluene and the liquid ink of Example 10 was assessed as previously described.

EXAMPLE 11
Preparation of a Heatset Oil Ink from Copper Phthalocyanine Including Disproportionated Rosin Added at the Conditioning Treatment Stage.

A mixture of 93.2 g crude Copper Phthalocyanine and 6.8 g so dium formate are ground in a ballmill until the phase change gives an α content of between about 50% and about 75%. 48.8 g of the ground Copper Phthalocyanine mixture d described above is added to 1.2 g of disproportionated rosin and 300 g of 2-ethyl hexanoic acid (2-EHA). The pigmented slurry is then stirred on a high speed mixer for about 1 hour at about 80° C. The high speed mixer was then replaced with a paddle stirrer and the pigmented slurry stirred for about 2 hours at about 80° C. Finally 219 g of 33% ammonium hydroxide solution is added. The slurry is filtered, washed with acetone until the pigment is free of 2-EHA and the beta pigment dried at room temperature.

The heatset oil ink of Example 11 was assessed as per Example 1.

EXAMPLE 12
Preparation of a Heatset Oil Ink from Copper Phthalocyanine Including Disproportionated Rosin Added at the Grinding Stage.

A mixture of 91.0 g crude Copper Phthalocyanine, 2.3 g disproportionated rosin and 6.7 g sodium formate are ground in a ballmill until the phase change gives an α content of between about 50% and about 75%. 50.0 g of the ground Copper Phthalocyanine mixture described above is added to 300 g of 2-ethyl hexanoic acid (2-EHA). The pigmented slurry is then stirred on a high speed mixer for about 1 hour at about 80° C. The high speed mixer was then replaced with a paddle stirrer and the pigmented slurry stirred for about 2 hours at about 80° C. Finally 219 g of 33% ammonium hydroxide solution is added. The slurry is filtered washed with acetone until the pigment is free of 2-EHA and the beta pigment dried at room temperature.

The heatset oil ink of Example 12 was assessed as per Example 1.

In the tests of Examples 1–12, dispersion is determined visually and graded by comparison with the standard levels of the control, + indicating one grade better than standard, ++ two grades better than standard, +++ three grades better than standard etc., and = indicating similar to standard. Colour strength and gloss are determined visually and instrumentally. Colour strength as defined herein, means, optical density/ink film weight, wherein the density is measured using a densitometer.

TABLE 1

|  | Example 1 | Example 2 | Example 3 |
| --- | --- | --- | --- |
| Dispersion Microscope | control | = | +++ |
| Spotting and filtration (1st pass) | control | = | +++ |
| Strength | control | = | +10 |
| Gloss | control | = | ++ |

Table 1 shows the advantages in an oil ink system when the rosin is added at the grinding stage before the conditioning treatment using a solvent.

TABLE 2

|  | Example 4 | Example 5 | Example 6 |
| --- | --- | --- | --- |
| Dispersion Microscope | control | = | = |
| Spotting and filtration (1st pass) | control | = | = |
| Strength | control | +10 | +5 |
| Gloss | control | ++ | ++ |

Table 2 shows the advantages in an oil ink system when the rosin is added at the grinding stage before the conditioning treatment using a liquid amine in the presence of a surfactant.

TABLE 3

|  | Example 7 | Example 8 |
| --- | --- | --- |
| Dispersion Microscope | control | = |
| Spotting and filtration (1st pass) | control | + |
| Strength | control | +8 |
| Gloss | control | + |

Table 3 shows the advantages in an oil ink system when the rosin is added at the grinding stage before the conditioning treatment using a solvent.

TABLE 4

|  | Example 9 | Example 10 |
| --- | --- | --- |
| Dispersion Microscope | control | ++ |
| Strength (coated) | control | +8 |
| Gloss (coated) | control | +++ |
| Strength (uncoated) | control | +5 |

Table 4 shows the advantages in a liquid ink system when the rosin is added at the grinding stage before the conditioning treatment with a solvent.

TABLE 5

|  | Example 11 | Example 12 |
| --- | --- | --- |
| Dispersion Microscope | control | ++ |
| Spotting and filtration (1st pass) | control | + |
| Strength | control | +4 |
| Gloss | control | ++ | table 5 shows the advantages in an oil ink system when the rosin is added at the grinding stage before the conditioning treatment using a carboxylic acid.

What is claimed is:

1. A process for the production of pigmentary copper phthalocyanine in the beta crystalline phase comprising:
    a) dry or aqueous milling of crude copper phthalocyanine in combination with a natural or chemically modified resin and, optionally, a grinding auxiliary followed by;
    b) isolation of the milled mass followed by;
    c) conditioning treatment of the milled mass in an aqueous polar solvent in the presence of hydroxide anions, the proportion of water to polar solvent being such that there is no phase separation, and said solvent being selected from solvents capable to form an azeotropic mixture with water.

2. A process according to claim 1 wherein the natural or chemically modified resin is selected from: rosin; chemically modified rosins such as hydrogenated, dehydrogenated or disproportionated rosin; dimerised or polymerised rosin; partially esterified rosin; non-esterified or partially esterified maleic- or phenolic-modified rosin and rosin or rosin derivatives polymerised with substances such as formaldehyde and mixtures thereof.

3. A process according to claim 1 wherein the resin is a hydrogenated rosin, a disproportionated rosin, a dimerised rosin or mixtures thereof.

4. A process according to claim 1 wherein the resin is present at a level of from about 1% to about 15% relative to the level of crude copper phthalocyanine employed.

5. A process according to claim 4 wherein the resin is present at a level of from about 2% to about 5% by weight, relative to the level of crude copper phthalocyanine employed.

6. A process according to claims 1 wherein the grinding auxiliary is selected from: calcium chloride, sodium chloride, sodium sulphate, sodium formate, sodium acetate or other organic or inorganic salt, phthalimide or phthalic anhydride and mixtures thereof.

7. A process according to claims 1 wherein the grinding auxiliary is selected from sodium formate, sodium chloride, sodium acetate and mixtures thereof.

8. A process according to claim 1 wherein the grinding auxiliary is present at a level of from about 2% to about 15% relative to the level of crude copper phthalocyanine employed.

9. A process according to claim 8 wherein the grinding auxiliary is present at a level of from about 6% to about 8% by weight, relative to the level of crude copper phthalocyanine employed.

10. A process according to claim 1 wherein the conditioning treatment is effected with a mixture of water and a solvent selected from: ethanol, n-propanol, isopropanol, n-butanol, iso-butanol, pentanol, or other lower alcohol; ethyl acetate or other lower alkyl monocarboxylate; acetone, methyl ethyl ketone, methyl isobutyl ketone or other dialkyl ketone; and 2-methoxy ethanol, 2-ethoxy ethanol or other lower alkoxy alkanol.

11. A process according to claim 1 wherein the conditioning solvent is present at a level of from about 200% to about 1000%, relative to the weight of the milled mass.

12. A process according to claim 11 wherein the conditioning solvent is present at a level of from about 400% to about 800% by weight, relative to the weight of the milled mass.

13. A process according to claim 1 for the production of pigmentary copper phthalocyanine comprising:
    a) dry milling of crude copper phthalocyanine in combination with hydrogenated wood rosin and sodium formate or sodium chloride or sodium acetate and mixtures thereof followed by;
    b) isolation of the milled mass by direct discharge from the milling apparatus, followed by;
    c) conditioning treatment of the milled mass by dispersion of the milled mass into an aqueous polar solvent in the presence of hydroxide anions, the proportion of water to polar solvent being such that there is no phase separation, and said solvent being selected from solvents capable to form an azeotropic mixture with water; followed by;
    d) heat treatment to convert the copper phthalocyanine from α to β form, followed by;
    e) treatment of the β form copper phthalocyanine mixture with dilute mineral acid and removal of the solvent and isolation of the β form copper phthalocyanine product by filtration and drying.

14. A process according the claim 1 for the production of pigmentary copper phthalocyanine in the beta crystalline phase wherein step a) is accomplished by aqueous milling of crude copper phthalocyanine in combination with a natural or chemically modified resin.

15. A process according to claim 14 wherein in step b) the milled mass is isolated in powder form.

16. A process according to claim 14 wherein in step b) the milled mass is isolated in the form of a "filter-cake".

17. β form copper phthalocyanine product obtained by the process according to claims 1.

18. The β form copper phthalocyanine product obtained by the process according to claim 1 for the preparation of oil inks; gravure inks, paints and plastics.

19. A method of preparation of a heatset oil ink using the β form copper phthalocyanine product obtained by the process according to claims 1.

20. A method of preparation of a liquid ink using the β form copper phthalocyanine product obtained by the process according to claim 1.

21. A process according to claim 1, wherein up to about 20% by weight, based on pigmentary copper phthalocyanine, of a derivative of copper phthalocyanine is added at any stage of said process.

22. A process of claim 21, wherein the amount of copper derivative phthalocyanine which is added is up to about 10% by weight, based on pigmentary copper phthalocyanine.

23. A process of claim 22, wherein the amount of copper derivative phthalocyanine which is added is from about 1% to about 5% by weight, based on pigmentary copper phthalocyanine.

24. A process of claim 21, wherein said copper derivative phthalocyanine is dimethylaminomethyl copper phthalocyanine or phthalimidomethyl copper phthalocyanine in which the number of substituent groups on the copper phthalocyanine molecule ranges from 1 to 4; sulphonated copper phthalocyanine; or amine salt of sulphonated copper phthalocyanine and mixtures thereof.

25. A process of claim 24, wherein said copper derivative phthalocyanine is dimethylaminomethyl copper phthalocyanine or phthalimidomethyl copper phthalocyanine in which the number of substituent groups on the copper phthalocyanine molecule ranges from 2 to 3.

26. A process of claim 24, wherein said copper derivative phthalocyanine is phthalimidomethyl copper phthalocyanine.

27. A process of claim 24, wherein said copper derivative phthalocyanine is sulphonated copper phthalocyanine.

28. A process of claim 24, wherein said copper derivative phthalocyanine is an amine salt of sulphonated copper phthalocyanine.

29. A process according to claim 1 wherein the conditioning treatment is effected with a mixture of water and a lower alcohol, selected from the group consisting of ethanol, n-propanol, isopropanol, n-butanol, iso-butanol, pentanol and other lower alcohols.

30. A process according to claim 29 wherein the conditioning treatment is effected with a mixture of water and n-butanol.

31. A process according to claim 29 wherein the conditioning treatment is effected with a mixture of water and isopropanol.

32. A process according to claim 29 wherein the mixture of water and lower alcohol contains more than 50% by weight of water.

33. A process according to claim 32 wherein the mixture of water and alcohol contains 80 to 98% by weight of water and 2 to 20% by weight of lower alcohol.

34. A process according to claim 29 wherein the mixture of water and lower alcohol contains more than 75% by weight of water.

35. A process according to claim 34 wherein the mixture of water and alcohol contains 90 to 95% by weight of water and 5 to 10% by weight of lower alcohol.

* * * * *